United States Patent Office 3,349,133
Patented Oct. 24, 1967

3,349,133
(2-PROPYNYLOXY) DERIVATIVES OF SUBSTITUTED BENZOPHENONE
George B. Sterling, Mogadore, Ohio, and Chester E. Pawloski, Bay City, Mich., assignors to The Dow Chemical Company, Midland, Mich., a corporation of Delaware
No Drawing. Filed Dec. 26, 1963, Ser. No. 333,615
5 Claims. (Cl. 260—591)

The compounds of the present invention correspond to the formula

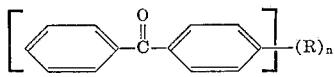

In this and succeeding formulae, R represents 2-propynyloxy and $n$ represents one of the integers 1 and 2.

The compounds of the present invention are organic liquids or solids which are somewhat soluble in common organic solvents and of low solubility in water. The compounds have been found to be useful as the toxic constituent in pesticidal compositions for the control of various plant, insect, mollusk, fish, worm, bacterial and fungal organisms, such as minnows, mites, blight, roundworms and tapeworms.

The compounds are prepared by reacting a propargyl halide with a substituted benzophenone corresponding to the following formula

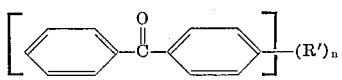

wherein R′ represents hydroxy. Representative hydroxy and dihydroxybenzophenones include 3-hydroxybenzophenone, 4-hydroxybenzophenone, 2,3′-dihydroxybenzophenone, 2,3-dihydroxybenzophenone, 2,6-dihydroxybenzophenone, 3,4′-dihydroxybenzophenone and 3,5-dihydroxybenzophenone. The reaction is carried out in the presence of a basic material and preferably in an organic liquid reaction medium such as acetone, methyl ethyl ketone, diethyl ketone, acetone-benzene and isopropanol. The reaction takes place smoothly at a temperature at which halide of reaction is produced and preferably at temperatures from about 0° to 100° C. The halide of reaction appears in the reaction mixture as the halide salt of the metal cation from the employed base. Representative basic materials include sodium and potassium carbonate.

Good results are obtained when employing one molecular proportion of substituted benzophenone and at least one-half molecular proportion, preferably an excess and greater than one molecular proportion, of each of the propargyl halide and the basic material. The reaction consumes the reactants in the proportion of one mole of substituted benzophenone and molar amounts of each of propargyl halide and basic material equal to the number of hydroxy groups on the substituted benzophenone starting material. For optimum yields, the use of reactants in amounts which represent such proportions is preferred.

In carrying out the reaction, the propargyl halide such as the chloride or bromide, the substituted benzophenone and the basic material can be combined in any convenient fashion. However, in a preferred procedure the reactants are dispersed in an organic liquid as reaction medium. The mixture of reactants, is then maintained at the reaction temperature until there is substantial cessation in the formation of the halide of reaction. This cessation indicates that the reaction is nearing completion. The halide of reaction can be removed by conventional procedures such as filtering the hot reaction mixture or diluting the reaction mixture with water and separating the product containing organic layer from the halide containing aqueous layer. The filtrate or the organic layer obtained during the dilution procedure can be used in pesticidal compositions or further purified by heating the filtrate to remove low boiling constituents and obtain the product as a residue.

In an alternative purification procedure, the reaction mixture is combined with an aqueous alkali metal hydroxide solution and the resulting mixture heated for a short period. The alkali metal hydroxide converts any unreacted substituted benzophenone starting materials to water soluble salts. Following the hydroxide treatment, the reaction mixture is washed with water. The organic layer obtained during the washing procedure can be employed in pesticidal applications or further purified by heating to remove the low boiling constituents and obtain the product as a liquid or solid residue.

The following examples are merely illustrations and are not to be construed as limiting.

*Example 1.—2-(2-propynyloxy)benzophenone*

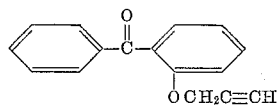

2-hydroxybenzophenone (50 grams), propargyl bromide (35 grams) and potassium carbonate (40 grams) were dispersed in 300 milliliters of acetone. The resulting mixture was heated with stirring at the boiling temperature and under reflux for twenty-four hours. Following this heating period, the reaction mixture was combined with 60 milliliters of aqueous 33 percent sodium hydroxide solution and the resulting mixture reheated for a short period. The heated mixture was then filtered to remove the halide of reaction and the filtrate heated to remove the low boiling constituents and obtain the product as a liquid residue. The 2-(2-propynyloxy)benzophenone product had a refractive index $n_D$ of 1.5970 at 25° C.

*Example 2.—2,4′-bis(2-propynyloxy)benzophenone*

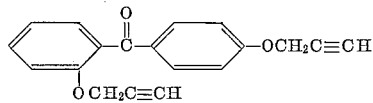

2,4′-dihydroxybenzophenone (30 grams), propargyl bromide (36 grams) and potassium carbonate (42 grams) were dispersed in 300 milliliters of acetone. The resulting mixture was heated with stirring at the boiling temperature and under reflux for thirty hours. Following the heating period, the reaction mixture was processed exactly as described in Example 1 to obtain the 2,4′-bis(2-propynyloxy)benzophenone product as a thick dark liquid having a refractive index $n_D$ of 1.5950 at 25° C.

*Example 3.—4,4′-bis(2-propynyloxy)benzophenone*

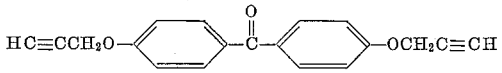

4,4′-dihydroxy benzophenone (30 grams), propargyl bromide (36 grams) and potassium carbonate (42 grams) were dispersed in 300 milliliters of acetone and the resulting mixture processed exactly as described in Example 2 to obtain the 4,4′-bis(2-propynyloxy)benzophenone product as a tan solid melting at 78° to 81° C.

*Example 4.—4-propoxy-2-(2-propynyloxy)benzophenone*

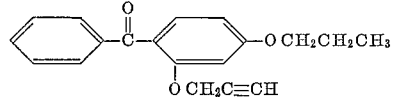

2-hydroxy-4-propoxybenzophenone (25 grams), propargyl bromide (15 grams) and potassium carbonate (17 grams) were dispersed in 200 milliliters of acetone. The resulting mixture was heated with stirring at the boiling temperature and under reflux for 24 hours. Following this 24 hour heating period the reaction mixture was combined with 30 milliliters of aqueous 33 percent sodium hydroxide solution and the resulting mixture reheated for a short period. The reaction mixture was then filtered to remove the halide of reaction and the filtrate heated to remove the low boiling constituents and obtain the product as a solid residue. The 4-propoxy-2-(2-propynyloxy)benzophenone product was recrystallized from methyl acetate to yield a solid product which melted at 62 to 64° C.

The following compounds of the present invention can be prepared in a similar manner:

2,4 - bis(2 - propynyloxy)benzophenone (molecular weight 242.3) by reacting together 2,4-dihydroxybenzophenone, propargyl chloride and potassium carbonate.

2,5 - bis(2 - propynyloxy)benzophenone (molecular weight 252.3) by reacting together 2,5-dihydroxybenzophenone, propargyl bromide and sodium carbonate.

3,3' - bis(2 - propynyloxy)benzophenone (molecular weight 252.3) by reacting together 3,3'-dihydroxybenzophenone, propargyl chloride and sodium carbonate.

3,4 - bis(2 - propynyloxy)benzophenone (molecular weight 242.3) by reacting 3,4-dihydroxybenzophenone, propargyl bromide and sodium carbonate.

2,3' - bis(2 - propynyloxy)benzophenone (molecular weight 242.3) by reacting together 2,3'-dihydroxybenzophenone, propargyl bromide and sodium carbonate.

The new compounds of the present invention are useful as herbicides and parasiticides for the control of a number of plant and parasite species. For such uses the unmodified compound may be employed. The product can also be dispersed on finely divided solid and employed as a dust. Such mixture can be dispersed in water with or without the aid of a surface active dispersing agent and the resulting aqueous dispersions employed as sprays, drenches or washes. In other procedures, the product of the invention can be employed as toxic constituents in solvent solutions, oil-in-water or water-in-oil emulsions or aqueous dispersions. In representative operations, compositions containing 4,4'-bis(2-propynyloxy)benzophenone in concentrations of 300 parts per million by weight gave 100 percent kills of roundworms. 4-propoxy-2-(2-propynyloxy)benzophenone is also useful as a herbicide and pesticide. In representative operations, aqueous compositions containing 4-propoxy-2-(2-propynyloxy)benzophenone at concentrations of 2 percent by weight gives substantially complete kills and control of plum curculio.

We claim:

1. A compound corresponding to the formula

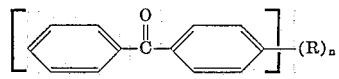

wherein R represents 2-propynyloxy and $n$ represents one of the integers 1 and 2.

2. 2-(2-propynyloxy)benzophenone.
3. 2,4'-bis(2-propynyloxy)benzophenone.
4. 4,4'-bis(2-propynyloxy)benzophenone.
5. 4-propoxy-2-(2-propynyloxy)benzophenone.

References Cited

UNITED STATES PATENTS 2,906,778   9/1959   Gordon _____ 260—591

LEON ZITVER, *Primary Examiner.*

DANIEL D. HORWITZ, *Examiner.*